United States Patent [19]

Atkinson

[11] 3,928,453

[45] Dec. 23, 1975

[54] PROCESS FOR THE PREPARATION OF SUBSTITUTED CYCLOHEXADIENONES

[75] Inventor: John Halstead Atkinson, Stockton-on-Tees, England

[73] Assignee: Imperial Chemical Industries Limited, London, England

[22] Filed: Feb. 20, 1973

[21] Appl. No.: 334,107

[30] Foreign Application Priority Data
Mar. 29, 1972 United Kingdom............... 14766/72

[52] U.S. Cl........ 260/586 R; 260/609 R; 260/613 D
[51] Int. Cl.²............... C07C 41/10; C07C 45/00; C07C 148/00
[58] Field of Search......... 260/396 N, 586 R, 613 D

[56] References Cited
UNITED STATES PATENTS
2,908,692   10/1959   Richert........................... 260/396 N
3,631,185   12/1971   Laufer............................ 260/586 R Primary Examiner—Vivian Garner
Attorney, Agent, or Firm—Cushman, Darby & Cushman

[57] ABSTRACT

Cyclohexadienones are produced by reacting trialkyl phenols with alcohols or thiols and chlorine in the presence of an acid acceptor. The process is of particular use in the production of 2,4,6-tri-tert.butyl-4-methoxycyclohexadi-2,5-ene-1-one which is produced from 2,4,6-tri-tert.butylphenol and which may be converted in situ into 2,6-di-tert.butyl-4-methoxyphenol.

9 Claims, No Drawings

PROCESS FOR THE PREPARATION OF SUBSTITUTED CYCLOHEXADIENONES

This invention relates to a chemical process.

This invention comprises a process for the production of a compound of formula

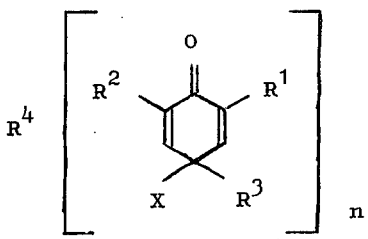

in which X is S or preferably O: $R^1$ and $R^2$ are individually alkyl groups having 4 to 12 carbon atoms and preferably being tertiary alkyl groups having 4 to 8 carbon atoms; $R^3$ is a tertiary alkyl group having 4 to 8 carbon atoms and $R^4$ is a residue derived from a thiol or alcohol having 1 to 20 carbon atoms and having $n$ SH or OH groups, and $n$ is 1, 2, 3 or 4, and preferably 1 or 2, and more preferably 1, by reacting a phenol of formula

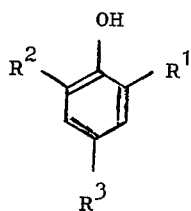

with an alcohol or thiol of formula $R^4(XH)_n$ and chlorine in the presence of an acid acceptor.

The alcohol or thiol preferably has 1 to 10 carbon atoms and may be, for example, ethylene glycol, hexane-1, 6-diol, or a $C_1$ to $C_6$ alkanol such as ethanol or a propanol, or more preferably methanol.

The reaction may be carried out in the presence of a solvent which may be, for example, an aliphatic or cycloaliphatic hydrocarbon having 5 to 12 carbon atoms, or a halohydrocarbon, for example chloroform or carbon tetrachloride, dioxan, acetonitrile, an ether or dimethylformamide. However, the alcohol or thiol of formula $R(XH)_n$ may itself act as a solvent.

It is believed that the reaction occurs in solution but the phenol may be present as a suspension. In this case, as the phenol is consumed further phenol passes into solution.

In a particularly preferred form of the invention the alcohol is methanol and the phenol is 2,4,6-tri-tert.butyl phenol.

The acid acceptor may be an organic base, for example a primary, secondary or tertiary alkylamine having 1 to 6 carbon atoms which may be a mono- or dialkylamine, for example trimethylamine or hexamethylenediamine or pyridine. It may also be an inorganic base soluble in the reaction medium, for example an alkali metal hydroxide or lower ($C_1$ to $C_6$) alkoxide such as sodium or potassium hydroxide or methoxide, or preferably it may be an inorganic base insoluble in the reaction medium, for example an alkaline or alkaline earth metal carbonate or bicarbonate such as sodium or potassium carbonate or bicarbonate, calcium carbonate or an alkaline earth metal hydroxide such as calcium hydroxide.

The reaction may be carried out at a wide range of pressures, for example 0.5 to 100 atmospheres absolute, but is very conveniently carried out at pressures in the range 5 to 40, and preferably 10 to 40 atmospheres absolute. The reaction may be carried out at temperatures in the range 10° to 200°C, and preferably 20° to 100°C, and is suitably carried out under reflux.

It is preferred that the alcohol or thiol should be supplied in at least the stoichiometric quantity and when it is serving as a solvent it is preferred that from 10 to 50 moles be provided per mole of the phenol.

It is preferred that 0.2 to 2, and more preferably 0.8 to 1.2 moles of chlorine be provided per mole of the phenol. The quantity of chlorine introduced may be readily controlled by introducing it as a liquid at elevated pressures, for example 5 to 40, and preferably 10 to 40, atmospheres absolute. The chorine may also be introduced as a gas.

At least 0.9, and preferably at least 1, for example 1 to 2 moles, of the acid acceptor is preferably provided per mole of chlorine.

When an inorganic base is used and the product is obtained as a solution it is often possible to filter off at this stage any unconsumed base and any chloride produced from the base, if necessary adjusting the solution to a temperature at which the product does not crystallise out. The product may, if desired, be converted to the corresponding phenol by elimination of the group $R^3$ as an olefine.

The process of the present invention is particularly applicable to the manufacture of 2,6-tri-tert.butyl-4-methoxyphenol which may be derived from 2,4,6-tri-tert.butyl-4-methoxycyclohexadi-2,5-ene-1-one by removal of the 4-butyl group with simultaneous aromatisation (see our British Pat. No. 1,307,841). In this embodiment of the invention the reaction is carried out in methanol which acts as both reaction medium and solvent. By choice of a suitable acid acceptor such as sodium carbonate co-product sodium chloride is produced which is insoluble in methanol and may be readily filtered off from the methanol solution of the cyclodienone. No further purification of the methanol solution is required and the debutylation may be carried out in situ by adding a debutylation catalyst, e.g. an acid such as sulphuric acid, p-toluene sulphonic acid, phosphoric acid or an acid activated earth, and heating at the reflux temperature of the solution. Following the debutylation the 2,6-di-tert.butyl-4-methoxyphenol crystallises from the methanol on cooling.

There have been alternative methods proposed for converting 2,4,6-tri-tert.butyl-4-methoxycyclohexadi-2,5-ene-1-one into 2,6-di-tert.butyl-4-methoxyphenol, but they possess several disadvantages over the method described above. For example, it has been suggested that the cyclohexadienone by converted to the phenol by pyrolysis at 200° to 260°C. This route, however, requires that relatively pure cyclohexadienone be used as starting material and also produces a number of byproducts notably 2-tert.butyl-4-methoxyphenol, 2,4-di-tert.butyl phenol and 2,4,6-tri-tert.butyl phenol. As the main use of 2,6-di-tert.butyl-4-methoxyphenol is as a food anti-oxidant the occurrence of these byproducts, as well as reducing the yield of the desired anti-oxidant also introduces a chance of contamination which would debar its use in food.

The formation of a methanol-insoluble chloride in the cyclohexadienone forming reaction is particularly significant in the production of 2,6-di-tert.butyl-4-methoxyphenol because it enables the subsequent debutylation to be carried out in situ in the methanol. If bromine, for example, is used instead of chlorine there is a greater likelihood of forming a methanol soluble product such as sodium bromide. In this case relatively involved techniques must be used to separate the bromide and cyclohexadienone, for if the latter remains contaminated with the bromide, then the effect of the acid debutylation catalyst is to liberate bromine which contaminates the 2,6-di-tert.-butyl-4-methoxyphenol colouring it yellow as well as rendering it unfit for use in food.

EXAMPLE 1

14.0 g. of gaseous chlorine was bubbled into a well stirred slurry of 50.0 g. of 2,4,6-tri-tert.butylphenol and 30.3 g. of sodium carbonate in 143 cc of methanol during 1 hour. The temperature of the reaction mixture rose from 20° to 48° during the addition. The reaction mixture was held at 50° for 1 hour and then at 65° for a further hour. The solution which contained 2,4,6-tri-tert.butylcyclohexadi-2,5-ene-1-one was filtered hot to remove inorganic material and the filtrate cooled to 20°–25° when 27.5 cc of concentrated sulphuric acid was added dropwise during 20 mins. with stirring. The resulting mixture was held under reflux for 1 hour, cooled to 20°–25°C, filtered, the solid product washed with a further 20 cc of cold methanol and dried to give fawn crystals (33.0 g.) of 2,6-di-tert.butyl-4-methoxyphenol m.pt. 102°. The product can be further purified by recrystallisation from methanol. The structure of the product was verified by infra-red spectroscopy.

EXAMPLE 2

A mixture of 2,4,6-tri-tert.butylphenol (131.0 g.), methanol (193.5 g.) and sodium carbonate (68.0 g.) was warmed to reflux (65°C) with stirring. Gaseous chlorine (38.25 gms.) was passed into this mixture over a period of 75 minutes and the resulting reaction mixture maintained at reflux for a further 330 minutes.

The reaction product was vacuum filtered at 50°C to remove all the inorganic material which was washed with methanol (96.2 gms.) and the methanol washings combined with the clear, deep orange filtrate (367.0 gms.) which contained 127.0 gms. of the compound, 2,4,6-tri-tert.butyl-4-methoxycyclohexadi-2,5-ene-1-one.

To the stirred solution of the cyclohexadieneone (127 gm.) in methanol (230 gm) at reflux (66°C) was slowly added concentrated sulphuric acid (88.2. gms.), over a period of 40 minutes. A slight evolution of heat was noted. A steady reflux was maintained for a further 4 hours. When the reaction product was cooled to 0°C in ice water, beige crystals of 2,6-di-tert.butyl-4-methoxyphenol were deposited. Vacuum filtration and a wash with methanol (50 mls.) yielded 107.5 gms. of crude product. Residual acid was removed by three successive slurries with water (3 × 170 mls.) to give 104.5 gms. of damp product. Recrystallisation from hot methanol (212.8 gms.) gave a pure white crystalline product (80.0 gms.) m.pt. 104.5°C. Identification was made by conventional spectroscopic methods.

I claim:
1. A process for the production of a compound of the formula

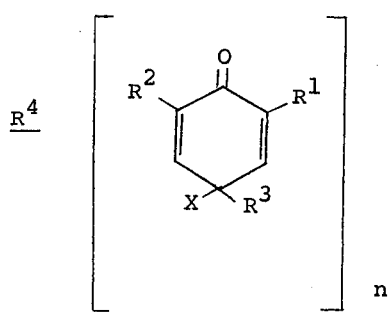

in which:
X is sulphur or oxygen;
$R^1$ and $R^2$ are individually alkyl groups having 4 to 12 carbon atoms;
$R^3$ is a tertiary alkyl group having 4 to 8 carbon atoms;
$R^4$ is an acyclic hydrocarbon residue derived from a thiol or alcohol having from 1 to 10 carbon atoms; and
$n$ is 1, 2, 3 or 4;
which comprises:
reacting a phenol of the formula

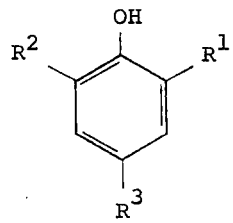

with an alcohol or thiol of the formula $R^4(XH)_n$, where $R^1$, $R^2$, $R^3$, $R^4$, X, and $n$ are as defined above, with chlorine in the presence of a base selected from the group consisting of primary, secondary and tertiary alkylamines having 1 to 6 carbon atoms, alkali metal hydroxides, alkali metal lower alkoxides, alkali metal carbonates, alkaline earth metal carbonates, alkali metal bicarbonates, alkaline earth metal bicarbonates, and alkaline earth metal hydroxides.

2. A process as claimed in claim 1 in which $R^1$ and $R^2$ are tertiary alkyl groups having 4 to 8 carbon atoms.

3. A process as claimed in claim 1 in which the alcohol is ethylene glycol, hexane-1,6-diol, methanol, ethanol or a propanol.

4. A process as claimed in claim 1 in which a solvent is present.

5. A process as claimed in claim 4 in which the solvent is selected from the group consisting of an aliphatic or cycloaliphatic hydrocarbon having 5 to 12 carbon atoms, a halohydrocarbon, dioxan, acetonitrile, an ether, dimethylformamide, an excess of the alcohol reactant and an excess of the thiol reactant.

6. A process as claimed in claim 1 in which the inorganic base is insoluble in the reaction medium.

7. A process as claimed in claim 6 in which the inorganic base is an alkali or alkaline earth metal carbonate or bicarbonate.

8. A process as claimed in claim 1 in which 2,4,6-tri-tert.butylphenol is reacted at 0.5 to 100 atmospheres absolute and at a temperature in the range 10° to 200°C with methanol and with 0.2 to 2.0 moles per mole of phenol of chlorine and with at least 0.9 mole of sodium carbonate per mole of chlorine, the reaction being carried out in excess methanol.

9. A process as claimed in claim 8 in which sodium chloride and unconsumed sodium carbonate are filtered from the methanolic solution of 2,4,6-tri-tert.-butyl-4-methoxycyclohexadi-2,5-ene-1-one and the said solution is heated with an acid debutylation catalyst to yield a solution of 2,6-di-tert.butyl-4-methoxyphenol.

* * * * *